United States Patent [19]

Katsube

[11] Patent Number: 4,917,511

[45] Date of Patent: Apr. 17, 1990

[54] INTERMITTENTLY MOVING DEVICE

[75] Inventor: Shinji Katsube, Outsu, Japan

[73] Assignee: Tsubakimoto Chain Co., Osaka, Japan

[21] Appl. No.: 222,768

[22] Filed: Jul. 22, 1988

[30] Foreign Application Priority Data

Jul. 24, 1987 [JP] Japan .................................. 62-185750

[51] Int. Cl.⁴ ......................... F16C 43/04; F16C 25/06
[52] U.S. Cl. ..................................... 384/540; 384/519; 384/585
[58] Field of Search ............... 384/447, 490, 517, 519, 384/537, 540–542, 559, 562, 583–585

[56] References Cited

U.S. PATENT DOCUMENTS

| | | | |
|---|---|---|---|
| 1,335,040 | 3/1920 | Burrows | 384/540 |
| 2,666,675 | 1/1954 | Rothweiler | 384/540 |
| 2,691,553 | 10/1954 | Pettigrew | 384/447 |
| 3,510,184 | 5/1970 | Gruber et al. | 384/519 X |
| 3,888,134 | 6/1975 | Miranda | 384/255 X |
| 4,213,660 | 7/1980 | Yasui et al. | 384/585 |

FOREIGN PATENT DOCUMENTS 0152136 10/1920 United Kingdom ................ 384/519

Primary Examiner—Thomas R. Hannon

[57] ABSTRACT

An intermittently moving device having an input shaft which a cam is attached to, and an output shaft which has a cam follower to be engaged with the cam and bearings mounted on both side of the cam follower so as to prevent inward movement toward the cam follower. The output shaft is adjustable in axial direction by screwing of adjusting wheels in which the bearings of the output shaft are inserted. The outward end face of the bearings are held by step differences.

3 Claims, 6 Drawing Sheets

PRIOR ART

PRIOR ART

INTERMITTENTLY MOVING DEVICE

BACKGROUND OF THE INVENTION

1. Field of the Invention

This invention relates to an intermittently moving device whereby the assembling precision is heightened and the mechanical efficiency is enhanced by realizing an easy and precise adjustment of the relative positions of the cam and the cam follower, and the efficiency of the assembling work is upgraded, and furthermore the width of the bearings can be shortened so as to reduce the size of an entire divice.

2. Background of the Invention

In indexing devices of machine tools, for example, in order to convert a continuous rotary motion into an intermittent rotary motion, an intermittently moving mechanism shown in FIG. 6 in which a cam (a) and a cam follower (b) are combined is widely used.

Such an intermittently moving device in which a cam (a) and a cam follower (b) are combined has many advantages: for example, it is small and light and can be used at high speed; but to the contrary, the relative positioning of the cam (a) and the cam follower (b) is difficult, and in particular, if the cam follower (b) deflects slightly in a direction of the shaft (c), the acceleration characteristic is impaired, vibration occurs, and other performances are lowered, and moreover its life is shortened.

In order to attach such a cam follower to the case, the shaft (c) to which the cam follower (b) was attached was conventionally fixed on the case (d) as shown in FIG. 7 and it was further fixed by using a housing (f) equipped with a bearing (e).

The bearing (e) had its inward surface abutted against the housing (f) and the outward surface against a nut (g) screwed in said shaft (c) so that the shaft (c) and the housing (f) were mounted so as to be immovable relatively.

In this way, the nut (g) was indispensable for fixing the shaft (c) on the bearing (e), and the width of the bearing hence became broad, which caused the entire size of the device to be large.

On the other hand, the relative positions of the cam follower and the cam were determined by introducing a shim (d) or the like between a flange (h) of the housing (f) and a wall surface of the case (d), so that a great amount of labor was therefore required in the assembling work.

SUMMARY OF THE INVENTION

It is an object of this invention to present an intermittently moving device capable of solving the above-discussed problems on the basis of the principle that an adjusting wheel to support the shaft to which a cam follower is attached is screwed in a case, so that a bearing can be formed in a narrow width, to downsize the device, and that positioning of the cam follower and the cam can be easily carried out, thereby enhancing the assembling precision and facilitating the assembling work.

DETAILED DESCRIPTION OF THE INVENTION

Figure 1:
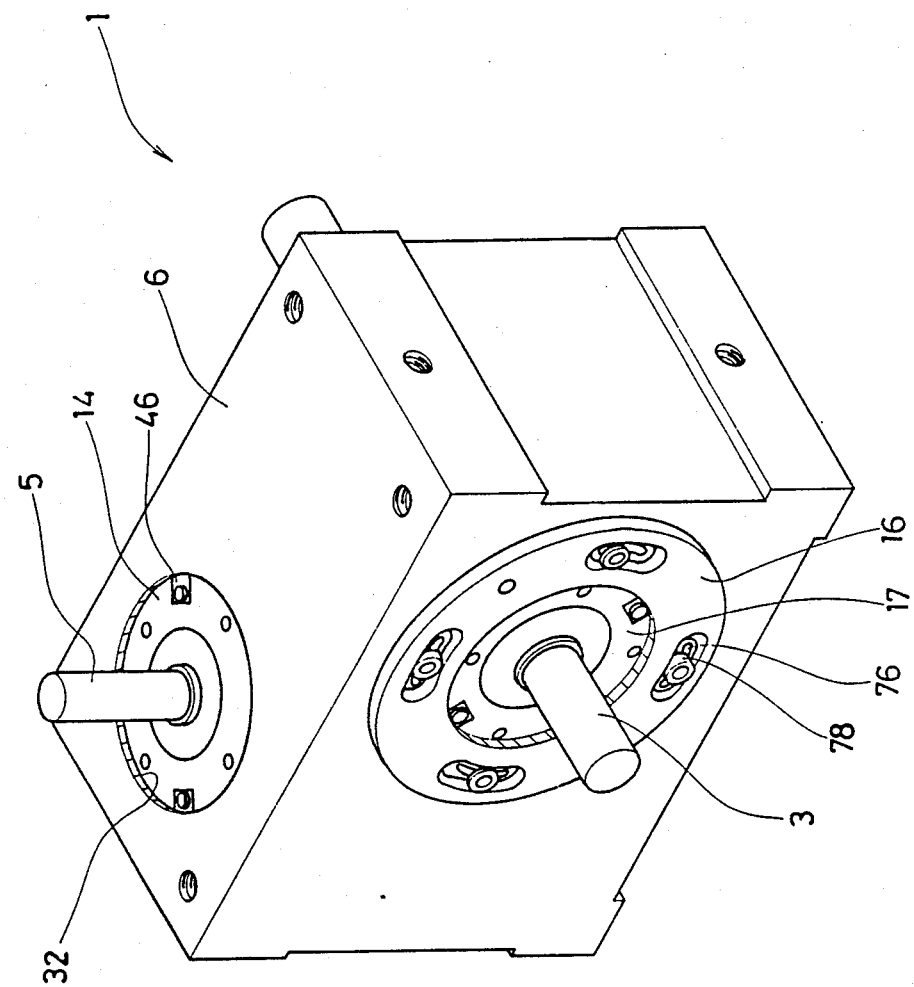
FIG. 1 is a perspective view showing an embodiment of this invention.
Figure 2:
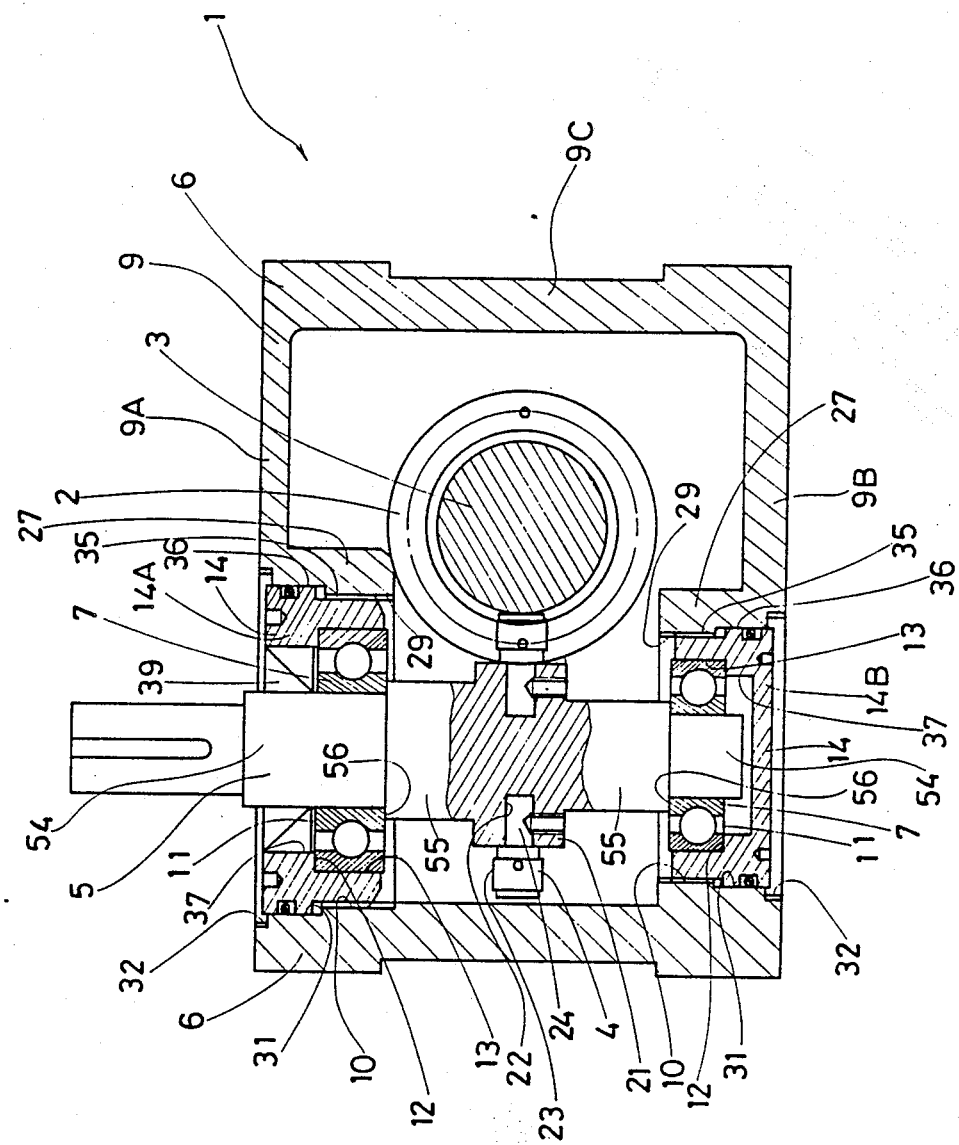
FIG. 2 is a longitudinal sectional view cut by the face passing the output shaft.
Figure 3:
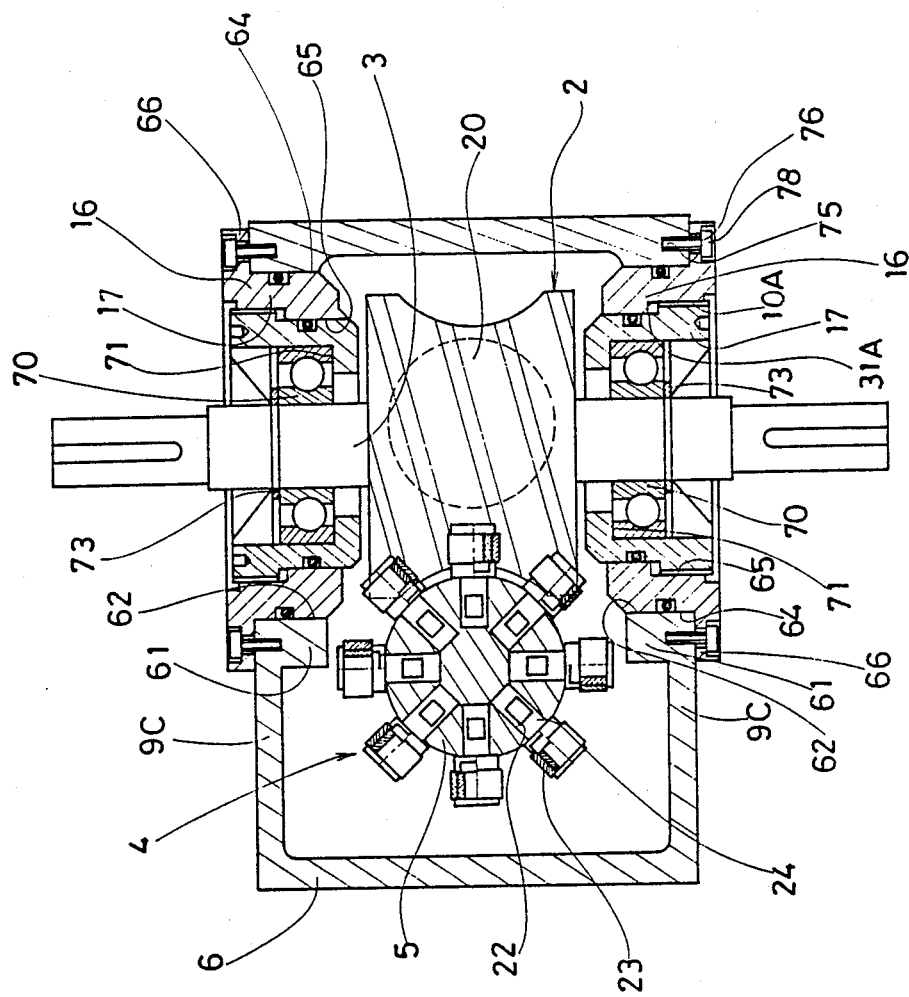
FIG. 3 is a lateral sectional view cut by the face passing the input shaft.

An intermittently moving device 1 of this invention is formed by supporting, in a case 6, an input shaft 3 equipped with a cam 2 and an output shaft 5 which crosses orthogonally with the input shaft 3 and is provided with a cam follower 4 to be engaged with the cam 2. The output shaft 5 has bearings 7 attached on both sides of the cam follower 4 so as to prevent inward movement toward the cam follower 4. The case 6 has inner screw holes 10 oppositely formed to each other on confronting walls 9 of the case 6, and the output shaft 5 is supported in the case 6 by adjusting wheels 14 which are screwed in the respective screw holes 10 and have bearing holes 13 with the 7 inserted thereinto. The outward end face 11 of the bearings 7 are held with step differences 12 formed in the bearing holes 13.

Accordingly, the output shaft can be fixed on the bearing 7 without using nuts as required conventionally, and it is therefore possible to form the adjusting wheel 14 in a narrow width and to reduce the total size of device. In addition the positioning of the cam follower 4 and the cam 2 can be performed precisely and easily.

An embodiment of this invention is explained hereinbelow by referring to the drawings.

In FIGS. 1 to 5, an intermittently moving device 1 of this invention has an input shaft 3 to which a cam 2 is attached and an output shaft 5 provided with a cam follower 4 supported in a case so as to cross orthogonally each other, whereby, by connecting the input shaft 3 to an unshown motor or the like, a continuous rotary output delivered from the motor is picked up as an intermittent rotary output from the output shaft through the engagement of the cam 2 and the cam follower 4, which is the structure of a well-known intermittently moving mechanism.

The cam 2 has a cam groove 20 formed on its circumferential surface, and the cam 2 and the input shaft 3 are formed integrally in this embodiment, so that they can not change position relative to each other.

The cam follower 4 is meanwhile formed by inserting pins 24 equipped with rollers 23 at their tips into mounting holes 22 pierced at equal angles on an outer surface of enlarged portion 21 which is located at a middle part of the output shaft 5.

The roller 23 can be inserted in said cam groove 20 of the cam 2, and by this insertion, the cam 2 and the cam follower 4 engage with each other.

The case 6 is formed in a square hollow box shape by joining the edges of an upper wall 9A and a lower wall 9B which are located longitudinally across a spacing and which are in rectangular plate shapes with a circumferential wall 9C comprising a longitudinal wall and a lateral wall confronting each other. The case 6 is formed, as described above, when surrounded by the wall 9.

On the case 6, bosses 27, 27 are pojected on the upper wall 9A and the lower wall 9B so as to confront each other, and in the bosses 27, 27 holes 29, 29 penetrating the case 6 from outside to inside are formed concentrically.

Figure 4:
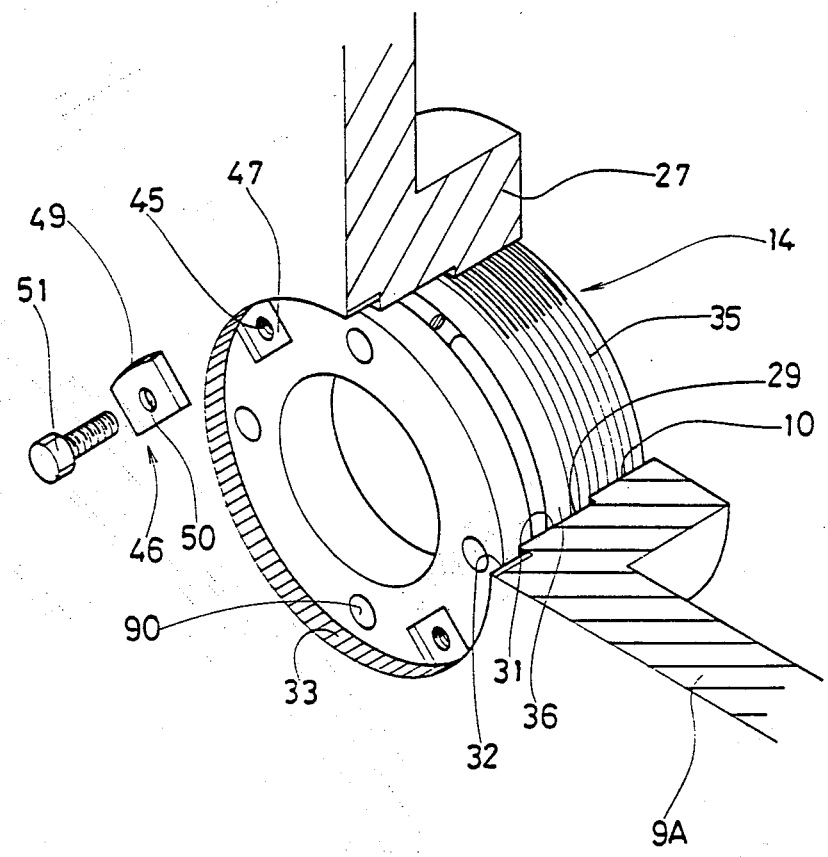
FIG. 4 is a perspective view showing an adjusting wheel.

The hole 29 has the inner screw hole 10 formed by cutting female threads at short pitches from the middle to the inner side, and a guide hole 31 formed in a larger diameter than that of the inner screw hole 10 on the outside of the inner screw hole 10 through a step difference. In this embodiment, as shown in FIG. 4, a notched groove 32 with a narrow width formed by notching the guide hole 31 is provided on the edge of the opening on the outer side of said guide hole 31, and at the same time, a stopping surface 33 in a triangular waveform which continues at small pitches around the notched groove 32 is formed on the surface of the notched groove 32.

An adjusting wheel 14 having a cylindrical shape has a male threaded part 35 cut in the outer surface so as to be located inside, and a guide part 36 connected with the male threaded part 35 through a step difference and engaged with said guide hole 31 of the case 6.

On the adjusting wheel 14 is formed the bearing hole 13 in which the bearing 7 is inserted, inside of the case and concentrically with said male threaded part 35. A stepped hole 37 with a small diameter is connected on the outside of the bearing hole 13 through the step difference 12.

In this embodiment, since an end of said output shaft 5 is projected from the upper wall 9A, in the adjusting wheel 14 which is mounted on the side of the upper wall 9A, the stepped hole 37 opens outward, and a seal 39 is pinched between the stepped hole 37 and the output shaft 5. In contrast, the lower adjusting wheel 14B mounted on the side of the lower wall 9B is formed blind without having any openings.

Figure 5:
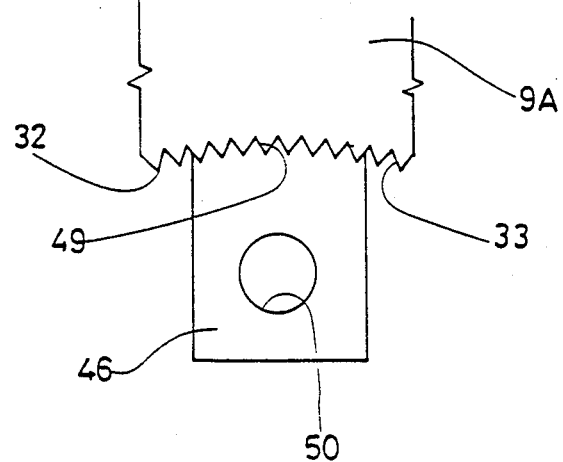
FIG. 5 is a diagram showing the engagement of a positioning piece and a case.
Figure 6:
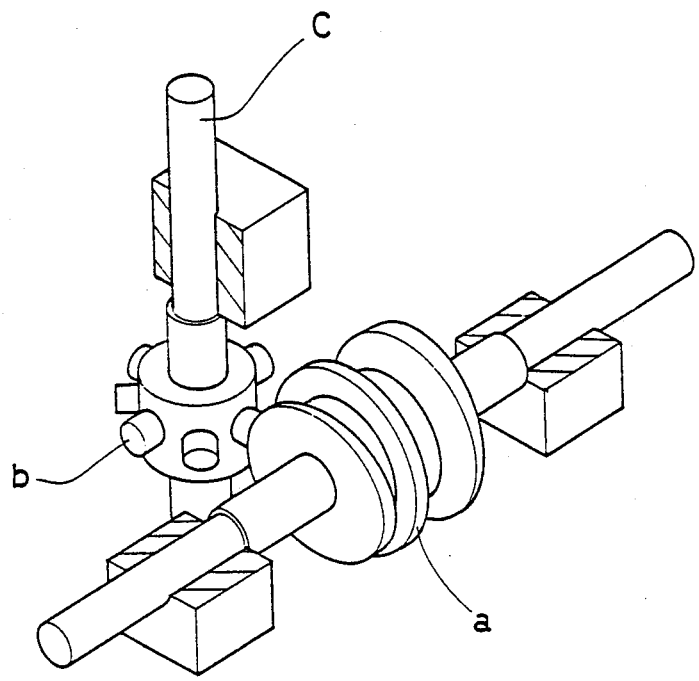
FIG. 6 is a perspective view showing the outline of the engagement of a cam and a cam follower.
Figure 7:
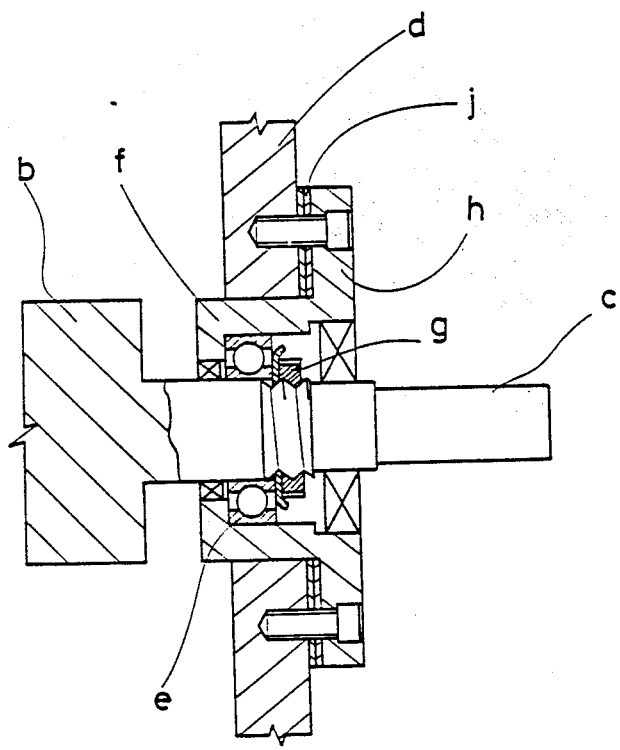
FIG. 7 is a sectional view showing a prior art.

On the end surface of the outer side of the adjusting wheel 14, a pair of blind tiny holes 90 for the insertions of the tool in which the adjusting wheels are screwed are formed so that they confront each other as shown in FIG. 4 and 5, and on the end surface is mounted a rectangular concave groove 47 which is shallow bottomed, flat and leading to the guide part 36 and has a tapped hole 45 in the middle and to which a positioning piece 46 is attached.

The positioning piece 46 is formed in a rectangular plate shape, and three sides thereof are engaged tightly with said concave groove 47. The remaining side is formed in a triangular waveform in the same pitch as the stopping surface 33 and is equipped with an engaging surface 49 to be engaged with the stepping surface 33 at arbitrary positions by every wave pitch. The positioning piece 46 also has a central bolt hole 50, so that the adjusting wheel 14 is refrained from turning by engaging the stopping surface 33 and the engaging surface 49 with each other and screwing a bolt 51, which penetrates the bolt hole 50, into the tapped hole 45.

The output shaft 5 connects a large diameter part 55 with a larger diameter than the bearing part 54 to the inner side of the bearing part 54, which is inserted in the bearing 7, through a step difference 56.

The output shaft 5 is therefore supported on the case 6 without being dislocated in its axial direction by mounting the output shaft 5 on the bearing 7 in contact with the end surface at the inside of the bearing 7 at the step difference 56, and screwing the adjusting wheel 14 into the bearing hole 13 and the bearing 7 into the inner screw hole 10 in the case 6 while fitting its circumferential surface until the step difference 12 abuts against the outer end 11 of the bearing 7.

In addition, by rotating the upper and lower adjusting wheels 14A, 15B in an identical direction and by an identical angle, the output shaft 5 can be inched in the vertical direction of the case 6, so that the cam follower 4 can be also moved vertically.

The input shaft 3 is located orthogonally to the output shaft 5 and penetrates the confronting peripheral walls 9C, 9C of said case 6. The peripheral walls 9C, 9C have inward bosses 61, 61 respectively projected oppositely, and the bosses 61, 61 are equipped concentrically with holes 62, 62 for inserting an eccentric wheel 16.

The eccentric wheel 16 fits in the hole 62, and it possesses an inner hole 65 which is slightly eccentric from the center of the outer surface 64, and it has also a flange 66 mounted around its outer side.

The inner hole 65 has an inner screw hole 10A and a guide hole 31A in the same way as the hole 21 on the output shaft side 5, and in the inner hole 65 is inserted the adjusting wheel 17 of the input shaft which is composed almost in the same way as the adjusting wheel 14 provided on the output shaft side. The adjusting wheel 17 of the input shaft 3 meanwhile possesses a step difference 71 to support the inward surface of a bearing 70 and this bearing 70 is fitted so as to be inwardly immobile, and moreover, by fixing a ring 73 which abuts against the outer surface of the bearing 70 on the input shaft 3, the input shaft 3 is supported in the bearing 70 so as not to move toward the cam 2.

The case 6 is incidentally pierced with a plurality of tapped holes at equal intervals which are located on the side of outer surface of the boss 61 concentrically with the center of the hole 62, and the flange 66 of the eccentric wheel 16 has an ellipsoidal bolt hole 76 being concentrical with said outer surface 64 and penetrating at the same position with the tapped hole 75.

As a consequence, by the positioning of the tapped hole 75 and the bolt hole 76, the inner hole 65 of the eccentric wheel 16 deflects vertically and laterally while its center draws a circle, and at the same time, the adjusting wheel 17 of said input shaft 3 fitted with the eccentric wheel 16 and the input shaft 3 supported thereby dislocate their centers. The eccentric wheel 16 can be mounted and fixed by screwing a bolt 78 penetrating the bolt hole 76 into the tapped hole 75 and fine adjustment of the eccentric length can be realized by rotating the eccentric wheel 16 in a moving range of the bolt hole 76 in the direction of major axis.

By rotating the adjusting wheels 17, 17 of the input shafts which are located on the right and left in an identical direction and by an identical angle, the input shaft 3 can be moved with regard to the case 6 in its axial direction, and its spiral turn can be prevented in the same way as in the adjusting wheel 14 of the output shaft 5 by using a positioning piece.

OPERATION

As described above, the output shaft 5 advances by rotating the upper and lower adjusting wheels 14A, 14B by an identical angle, and to the contrary, it retreats by the reverse rotation. Owing to the movement of the output shaft 5 in the axial direction, the cam follower 4 can adjust the engaging position with the cam 2 and they can be engaged at a correct position. The positioning piece 46 can stop the spiral turn of the adjusting wheel 14 by engaging its engaging surface 49 with the stopping surface 33 of the case 6 and bolting the adjusting wheel 14, and the lateral slip of the cam follower 4 therefore can be prevented.

The cam 2, moreover, can rotate the eccentric wheel 16 if necessary and can adjust the position by the spiral turn of the adjusting wheel 17 of the input shaft in the longitudinal, vertical and axis-orthogonal directions with regard to the cam follower 4.

EFFECTS OF THE INVENTION

The intermittently moving device of this invention, as desribed above, wherein an output shaft to which a cam follower is attached is mounted on the bearing so as not to move inward, inner screw holes are formed on the wall of the case, and an adjusting wheel is provided with a bearing hole for fitting a bearing in and also having a step differnece to support the outward surface of the bearing is screwed in the inner screw hole, is therefore capable of positioning the cam and cam follower by spirally turning the adjusting wheel by simple operation, thereby enhancing the efficiency of the assembling work, upgrading the precision of the positioning, inhibiting the occurrence of the vibrations, advancing the mechanical efficiency and acceleration characteristic, and extending the life of the device.

In addition, since a nut conventionally used for positioning can be omitted, the bearing part can be formed in a narrow width, so that the downsizing of the device and the reduction of cost can be realized.

Here, as for the inner screw holes, both may be threaded in an identical direction or in different directions, and for the stoppers of turnings on the adjusting wheels, knock pins can be used. In this way, the present invention can be modified in various shapes and structures.

What is claimed is:

1. An intermittently moving device comprising a case, an input shaft to which a cam is attached, an output shaft which crosses orthogonally with said input shaft and is provided with a cam follower to be engaged with said cam;

said case has inner screw holes which are formed on a first pair of confronting walls of the case, an opening end of each of said holes is provided with circumferential notched grooves having an engaging surface, a second set of inner holes are formed on a second pair of confronting walls which are at right angles to said first pair of confronting walls;

said output shaft has bearings mounted on both sides of said cam follower so as to prevent inward movement toward said cam follower and, is supported in said case by adjusting wheels;

each of said adjusting wheels has a bearing hole provided with a step difference in order to insert said bearing thereinto and to hold the outward end face of said bearing with said step difference, and is screwed in said respective inner screw holes; and each of said adjusting wheels is held in place by a locking piece which is mounted on the outward end face of said adjusting wheel and engaged with said engaging surface of said notched grooves.

2. An intermittently moving device as claimed in claim 1 wherein:

said input shaft has bearings mounted on both sides of said cam so as to disable outward movement, and is supported in said case by eccentric wheels and adjusting wheels;

each of said eccentric wheels is inserted in a respective inner hole of said second set of inner holes, and has an eccentric screw hole being eccentric to said inner hole; and each of said adjusting wheels has a bearing hole provided with a step difference in order to insert said bearing of input shaft thereinto and to hold the inward end face of said bearing of the input shaft with said step difference, and is screwed in said eccentric screw hole.

3. An intermittently moving device comprising a case, an input shaft to which a cam is attached and an output shaft which crosses orthogonally with said input shaft and is provided with a cam follower to be engaged with said cam;

said case has inner holes which are formed on one pair of confronting walls of the case;

said input shaft has bearings mounted on both sides of said cam so as to prevent outward movement, and is supported in said case by eccentric wheels and adjusting wheels, said eccentric wheel is inserted in said respective inner holes and has an eccentric screw hole being eccentric to said inner hole; and said adjusting wheel has a bearing hole provided with a step difference in order to insert said bearing thereinto and to hold the inward end face of said bearing with said step difference, and is screwed in said eccentric screw hole.

* * * * *